United States Patent
Dahanayake et al.

(10) Patent No.: US 6,476,168 B1
(45) Date of Patent: Nov. 5, 2002

(54) EMULSIONS HAVING ACTIVATING AGENTS OF ALKOXYLATES OF 6,6-DIMETHYLBICYCLO [3.1.1] HEPT-2-ENE-2-ETHANOL

(75) Inventors: Manilal S. Dahanayake, Princeton Junction, NJ (US); Fang Li, East Brunswick, NJ (US); Jean-Luc Joye, Cranbury, NJ (US)

(73) Assignee: Rhodia, Inc., Cranbury, NJ (US)

( * ) Notice: Subject to any disclaimer, the term of this patent is extended or adjusted under 35 U.S.C. 154(b) by 0 days.

(21) Appl. No.: 09/952,199

(22) Filed: Sep. 14, 2001

(51) Int. Cl.$^7$ ............... C08F 120/56; C08F 220/56; B01F 17/42; C08J 3/00
(52) U.S. Cl. ............... 526/303.1; 516/30; 516/76; 516/920; 516/925; 523/336; 524/804; 526/932
(58) Field of Search ............... 516/30, 76, 925, 516/920; 526/303.1, 932; 524/804; 523/336; 510/421; 568/612

(56) References Cited

U.S. PATENT DOCUMENTS

| | | | |
|---|---|---|---|
| 2,616,930 A | * 11/1952 | Schmerling | 516/76 X |
| 3,284,393 A | 11/1966 | Vanderhoff et al. | |
| 3,624,019 A | 11/1971 | Anderson et al. | |
| 3,734,873 A | 5/1973 | Anderson et al. | |
| 3,997,492 A | 12/1976 | Kane et al. | |
| 4,024,097 A | 5/1977 | Slovinsky et al. | |
| 4,147,681 A | 4/1979 | Lim et al. | |
| 4,252,706 A | 2/1981 | Phillips et al. | |
| 4,656,222 A | * 4/1987 | DeFazio | 526/932 X |
| 5,124,376 A | * 6/1992 | Clark, Jr. | 523/336 |
| 5,674,823 A | * 10/1997 | Ricca et al. | 568/612 X |
| 5,817,885 A | * 10/1998 | Ricca et al. | 568/612 |
| 5,952,398 A | * 9/1999 | Dietz et al. | 524/804 X |

* cited by examiner

*Primary Examiner*—Richard D. Lovering
(74) *Attorney, Agent, or Firm*—Ohlandt, Greeley, Ruggiero & Perle, L.L.P.

(57) ABSTRACT

Disclosed is an emulsion useful in an inversion process. The emulsion is a water-in-oil emulsion and has an aqueous phase having a water-soluble polymer, an oil phase and an activating agent of the following formula:

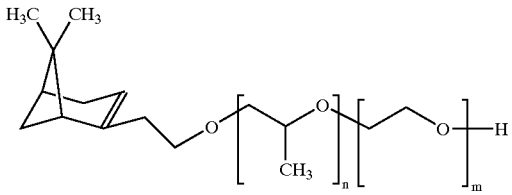

wherein n=0 to 10 and m=2 to 25 and the oxypropylene and oxyethylene units are of block distribution or intermixed in random or tapered distribution. Further disclosed is a process according to the following: a) providing an water-in-oil emulsion having a water-soluble polymer in the aqueous phase and the activating agent; b) introducing the emulsion into an aqueous medium and c) allowing sufficient time for the emulsion to invert. Further disclosed is another process according to the following: a) providing an water-in-oil emulsion having a water-soluble polymer in the aqueous phase; b) introducing the emulsion into an aqueous medium having the activating agent and c) allowing sufficient time for the emulsion to invert.

27 Claims, No Drawings

EMULSIONS HAVING ACTIVATING AGENTS OF ALKOXYLATES OF 6,6-DIMETHYLBICYCLO [3.1.1] HEPT-2-ENE-2-ETHANOL

BACKGROUND OF THE INVENTION

1. Field of the Invention

The present invention relates to water-in-oil emulsions having alkoxylates of 6,6-dimethylbicyclo[3.1.1]hept-2-ene-2-ethanol as activating agents. Further, the present invention relates to methods of using such emulsions.

2. Description of the Prior Art

Water-soluble polymers, both synthetic and natural, have been employed in aqueous solution as thickening and flocculating agents. They have found commercial use in a variety of end uses such as wastewater treatment and water purification, papermaking, petroleum recovery and oil drilling mud stabilizers.

Water-soluble polymers are typically stored and delivered in the form of water-in-oil emulsions. The emulsion form is preferred because of the tendency of the polymers to agglomerate and clump in aqueous solution. Use of the emulsion form enhances dispersion of the polymers in aqueous media and environments in the various end uses.

When water-in-oil emulsions containing water-soluble polymers are introduced into an aqueous medium, a dispersion of oil droplets containing the polymers is formed. For the polymers to modify the physical characteristics and properties of the medium, the polymers must be released from the internal aqueous phase within the droplets to the external aqueous phase of the medium. This release phase is frequently referred to as "inversion."

Although the phenomena of inversion is not well understood, it is believed to occur as a result of osmotic pressure. The osmotic pressure may occur as a result of gradients in chemical potential between the internal aqueous phase and the external aqueous phase. Water permeates into the oil droplets, causing the internal aqueous phase and, concomitantly, the oil droplet itself, to swell or expand. When the oil droplets are no longer able to contain the swollen internal aqueous phase, it along with the water-soluble polymer, is released into the external aqueous phase.

Due to the relatively high cost of the water-soluble polymers, it is desirable to maximize their effect as thickeners and flocculants and minimize required levels. One means of accomplishing this is to enhance the efficiency of the inversion process. The efficiency of the inversion process can be enhanced by the inclusion of surfactants, frequently referred to as "activating agents" in this context. The prior art discloses the use of various surfactants or activating agents in inversion processes in U.S. Pat. Nos. 3,624,019; 3,734,873; 3,997,492; 4,024,097; 4,147,681; and 4,252,706. Some surfactants disclosed include ethoxylated alkyl phenols, polyoxyethylene vegetable oil, polyoxyethylene fatty alcohols, sulfated castor oil, nonyl phenol ethoxylates, sorbitan monooleate, fatty amides and fatty alkanolamides.

Although known activating agents have been effective in accelerating inversion processes, it would be desirable to have an activating agent that provided better acceleration and release of water-soluble polymers in aqueous medium.

Some of the known activating agents, particularly the ethoxylated alkyl phenols most commonly used, have raised environmental concern due to slow biodegradation potential. It would further be desirable to have an activating agent that exhibited minimal environmental impact.

SUMMARY OF THE INVENTION

An object of the present invention is to provide an improved activating agent for use in a water-in-oil emulsion in an inversion process.

Another object of the present invention is to provide an activating agent that provides a fast inversion time for a water-in-oil emulsion having a water-soluble polymer therein.

Another object of the present invention is to provide an activating agent that has a relatively low impact on the environment.

This and other objects of the invention are seen in a water-in-oil emulsion useful in an inversion process. The emulsion has an aqueous phase having a water-soluble polymer and an activating agent of the following formula:

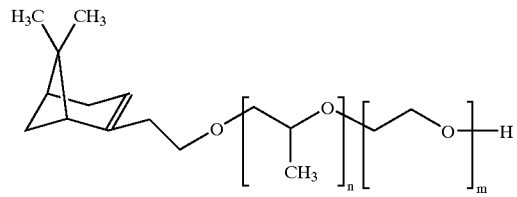

wherein n=0 to 10 and m=2 to 25. The moiety qualified by the integer "n" corresponds to oxypropylene units. The moiety qualified by the integer "m" corresponds to oxyethylene units. The oxypropylene and oxyethylene units may be of block distribution or intermixed in random or tapered distribution along the chain.

There is an inversion process according to the following: a) providing an water-in-oil emulsion having a water-soluble polymer in the aqueous phase and the activating agent; b) introducing the emulsion into an aqueous medium and c) allowing sufficient time for the emulsion to invert.

There is another inversion process according to the following: a) providing an water-in-oil emulsion having a water-soluble polymer in the aqueous phase; b) introducing the emulsion into an aqueous medium having the activating agent and c) allowing sufficient time for the emulsion to invert.

DETAIL DESCRIPTION OF THE INVENTION

It was found surprising and unexpected that a water-in-oil emulsion having a water soluble polymer could be formulated to deliver a fast activation time (inversion time) in aqueous media. The activation agent comprises an alkoxylate of 6,6-dimethylbicyclo[3.1.1]hept-2-ene-2-ethanol. The term "activating agent" and the term "surfactant" may be used interchangeably herein.

The activating agent useful in the process of the present invention is of the following formula:

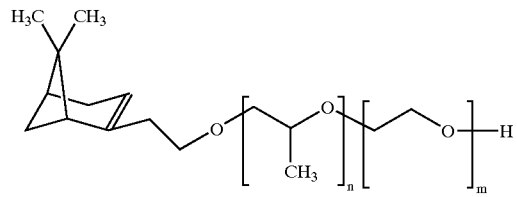

wherein n=0 to 10 and m=2 to 25. Preferably, n=0 to 5 and m=4 to 15. Most preferably, n=2 to 4 and m=4 to 13. The moiety qualified by the integer "n" corresponds to oxypropylene units. The moiety qualified by the integer "m" corresponds to oxyethylene units. The oxypropylene and oxyethylene units may be of block distribution or intermixed in random or tapered distribution along the chain. The compounds of the formula may also be described as alkoxylates of 6,6-dimethylbicyclo[3.1.1]hept-2-ene-2-ethanol.

Emulsions of the present invention will exhibit an activation time (inversion time) in water of preferably about 30 second or less, more preferably about 20 seconds or less and most preferably about 10 seconds or less. Activation time is determined in accordance with the standard vortex method described below.

The water-soluble polymer is obtained by chain polymerization of monomers selected from the group consisting of acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates. The foregoing list of monomers is exemplary, and is not to be construed as limiting. The structure and properties of the polymer may be controlled by monomer content and degree of polymerization. Preferably, the water-soluble polymer will be formed in-situ via emulsion polymerization. Useful polymers and processes for making polymers are disclosed in U.S. Pat. Nos. 3,284,393; 3,624,019; 3,734,873; 3,997,492; 4,024,097; 4,147,681; and 4,252,706, which are incorporated herein by reference.

Water-in-oil emulsions of the present invention are preferably formed as a product of emulsion polymerization. In emulsion polymerization, monomers of the desired water-soluble polymer are mixed with water and any water-soluble adjuvants to form an aqueous phase, which is subsequently blended with an oil phase to form a constituted water-in-oil emulsion. Polymerization is then effected. The activating agent, one or more alkoxylates of 6,6-dimethylbicyclo[3.1.1]hept-2-ene-2-ethanol, can be added to the constituted water-in-oil emulsion by blending into either or both of the aqueous phase or the oil phase prior to blending of the phases. The activating agent can also be blended with the constituted emulsion after the blending of the aqueous and oil phases and before, during or after the initiation of polymerization. Most preferably, the activating agent is added to the constituted emulsion after polymerization is substantially complete.

Water-in-oil emulsions of the present invention may also be formed-by simple blending of components. The aqueous phase may be formed by blending water, the water-soluble polymer and any water-soluble adjuvants. The oil phase may be formed by blending any hydrophobic solvents or vehicles with any oil-soluble adjuvants. The aqueous phase and the oil phase may then blended to form the emulsion. The activating agent, one or more alkoxylates of 6,6-dimethylbicyclo[3.1.1]hept-2-ene-2-ethanol, may be added to either of the two phases or the constituted emulsion. Teachings to the formation of water-in-oil emulsions and the incorporation of surfactants and emulsifiers is seen by way of example in U.S. Pat. Nos. 3,284,393; 3,624,019; 3,734,873; 3,997,492; 4,024,097; 4,147,681; and 4,252,706.

The activating agent, one or more alkoxylates of 6,6-dimethylbicyclo[3.1.1]hept-2-ene-2-ethanol, is soluble to varying degrees in both the water phase and the oil phase of the emulsion. Thus, the activating agent may be present in either or both phases as well as the interface of the phases. The activating agent is more soluble in water than in oil, so concentrations will tend to be higher in the aqueous phase and the interface than in the oil phase.

In an alternate embodiment of the process of the present invention, the activating agent, one or more alkoxylates of 6,6-dimethylbicyclo[3.1.1]hept-2-ene-2-ethanol, may be added to the aqueous medium into which the emulsion is introduced rather than be present in the emulsion itself.

The emulsions of the present invention may have cosurfactants or co-activating agents therein other than the activating agents described above. Cosurfactants useful in the present invention include those known in the art for water-in-oil emulsions. Useful cosurfactants can be water-dispersible or oil-dispersible. They can be anionic, cationic, or nonionic.

Useful cosurfactants include ethoxylated nonyl phenols, ethoxylated nonyl phenol formaldehyde resin, dioctyl esters of sodium sulfosuccinate, octyl phenol polyethoxy ethanol, soaps such as sodium and potassium myristate, laurate, palmitate, oleate, stearate, resinate and hydroabietate, alkali metal alkyl or alkylene sulfates, such as sodium lauryl sulfate, potassium stearyl sulfate, alkali metal alkyl or alkylene sulfonates, such as sodium lauryl sulfonate, potassium stearyl sulfonate, and sodium cetyl sulfonate, sulfonated mineral oil, as well as the ammonium salts thereof, and salts of high amine such as lauryl amine hydrochloride and stearyl amine hydrobromide, alkali metal salts of alkyl-aryl sulfonic acids, sodium dialkyl sulfosuccinate, sulfated or sulfonated oils, e.g., sulfated castor oil, sulfonated tallow and alkali salts of short chain petroleum sulfonic acids.

Useful cationic surfactants include salts of long chain primary, secondary, or tertiary amines, such as oleylamine acetate, cetylamine acetate, di-dodecylamine lactate, the acetate of aminoethyl-stearamide, dilauroyl triethylene tetraamine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Useful nonionic surfactants include condensation products of higher fatty alcohols with ethylene oxide, such as the reaction product of oleyl alcohol with ethylene oxide; alkoxylates of tall oil fatty acids; condensation products of alkyl phenols with ethylene oxide, such as the reaction products of isoctylphenol with ethylene oxide, condensation products of higher fatty acid amides with ethylene oxide, polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitol-anhydride, called Mannitan, and sorbitol-anhydride, called Sorbitan), such as glycerol monopalmitate reacted with ethylene oxide, pentaerythritol monoleate reacted with ethylene oxide, sorbitan monostearate reacted with ethylene oxide; long chain polyglycols in which one hydroxyl group is esterified with a higher fatty acid and the other hydroxy group is etherified with a low molecular alcohol, such as methoxypolyethylene glycol monostearate.

Other useful cosurfactants include, but are not limited to, sorbitan sesquioleate, polyoxyethylene alkyl phenol, polyoxyethylene cetyl ether, polyoxyethylene alkylaryl ether, polyoxyethylene monolaurate, polyoxyethylene vegetable oil, polyoxyethylene sorbitan monolaurate, polyoxyethylene sorbitol hexaoleate, polyoxyethylene esters or mixed fatty and resin acids, polyoxyethylene sorbitol lanolin derivative, polyoxyethylene tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene stearyl ether, polyoxyethylene oleyl ether, polyoxyethylene tridecyl ether, polyoxyethylene fatty alcohol, polyoxyethylene alkyl amine, polyoxyethylene glycol monopalmitate, polyoxyethylene sorbitan monopalmitate, polyoxyethylene cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate. A combination of two or more of the foregoing cosurfactants may be used. Other useful cosurfactants include those surfactants disclosed in U.S. Pat. Nos. 3,624,019; 3,734,873; 3,997,492; 4,024,097; 4,147,681; and 4,252,706.

The oil phase may be any inert hydrophobic liquid. Preferred group of organic liquids are aromatic and aliphatic hydrocarbon liquids. Examples include benzene, xylene, toluene, mineral oils, mineral spirits, kerosenes, naphthas, petrolatums, paraffinic and/or naplthelanic oils, oils of dibasic esters, and natural vegetable oils.

The amount of oil used in the emulsion in relation to water to prepare the emulsion may be varied over wide ranges. As a general rule, the amount of water-to-oil may vary between 5:1 to 1:10 with the preferred amount of water-to-oil being in the ratio of 1:1 to 1:10.

The emulsions of the present invention are useful in a variety of end use applications wherein the addition of a water-soluble polymer to an aqueous medium is desired. The polymers are useful as thickeners, suspending agents and flocculating agents. The polymers adsorb onto suspended solids and destabilize them, which causes them to clump or aggregate into a mass large enough to be separated from the aqueous medium. Useful commercial applications include wastewater treatment and water purification, papermaking, petroleum recovery and oil drilling mud stabilizers. Specific examples of useful commercial applications include clarification of drinking water, clarification of water used in coal washing operations, improvement in retention of solids in papermaking machines, and improvement in filtration rate of and increasing sludge cake solids in municipal and industrial waste treatment.

EXAMPLES

Emulsions of the present invention were prepared and tested for activation time in water and for foam stability. For purposes of comparison, emulsions with two conventional activating agents were also tested for the same properties.

The emulsions were prepared by mixing the water-soluble polymer in the aqueous phase, mixing the activating agents in the oil phase, and then mixing the two phases.

Two water-soluble polymers, polyacrylamides of high molecular weight and high cationic charge density, were employed. Polymer #1 had a molecular weight of 10,000 and a charge density of 10 percent. Polymer #2 had a molecular weight of 20,000 and a charge density of 60 percent. The water-soluble polymers were commercially supplied as water-in-oil emulsions. The same water-soluble polymers were used in both the emulsions of the present invention and for those of the comparative examples.

The activation agents employed in the examples were seven different Nopol alkoxylates developed by Rhodia, Inc. under the tradename Rhodoclean. The Nopol alkoxylates corresponded to alkoxylates of 6,6-dimethylbicyclo[3.1.1]hept-2-ene-2-ethanol. The Nopol alkoxylates had the following alkoxylate ratios: 4PO/5EO, 4PO/7EO, 4PO/9EO, 4PO/11EO, 5PO/5EO, 5PO/11EO, and 5PO/13EO). All were 100% active. The activation agent was employed at a 5 wt % level based upon the weight of the emulsion.

The activation agents employed in the comparative examples were EM-51 of The Dow Chemical Company and Cationic Activator 200 of Rhodia, Inc. Both are alkoxylates of tridecyl alcohols. The activation agent was employed at a 5 wt % level based upon the weight of the emulsion.

Activation times of the water-soluble polymers in the emulsions were determined according to standard vortex method. The vortex method was carried out according to the following:

1. Six (6) grams of polymer and 5 wt % activator (by weight of polymer) and were mixed in a 20 milliliter scintillation vial for at least 30 minutes using magnetic stirrer.
2. A bottle having 98 grams of hard water (200 ppm $CaCO_3$) was placed under a Heidolph Stirrer fitted with a 3-blade propeller. The blades were positioned about 1 cm from the bottom of the bottle).
3. The stirrer speed was adjusted to about 2000 rpm, so that a vortex would reach the bottom of the bottle.
4. The scintillation vial was shaken with a Vortex-Genie Mixer at highest speed. Samples (2 cc) were withdrawn from the vial via syringe.
5. The samples were injected into the vortex and start the stopwatch. The time elapsed from the injection to the disappearance of the vortex corresponded to the activation time. The test was conducted at room temperature (23° C.).

The activation times for emulsions having water-soluble polymer #1 and the different activation agents were the following: 252 seconds (EM-51), 214 sec (Cationic 200), 310 sec (4PO/7EO), 44.2 sec (4PO/9EO), 55.4 sec (4PO/11EO), 35.6 sec (5PO/11EO) and 31.5 sec (5PO/13EO).

For emulsions having water-soluble polymer #1, the emulsion having Rhodoclean 5PO/13EO exhibited the lowest inversion rate. The emulsions having Rhodoclean 4PO/9EO, 4PO/11EO, 5PO/11EO and 5PO/13EO exhibited significantly lower inversion times than the emulsions having EM-51 and Cationic 200.

The activation times for emulsions having water-soluble polymer #2 and the different activation agents were the following: 34 sec (EM-51), 76 sec (Cationic 200), 84 sec (4PO/5EO), 6.1 sec (4PO/7EO), 8.45 sec (4PO/9EO), 8.6 sec (4PO/11EO), 8.75 sec (5PO/11EO) and 8.9 sec (5PO/13EO).

For emulsions having water-soluble polymer #2, the emulsion having Rhodoclean 4PO/7EO exhibited the lowest inversion rate. The emulsions having Rhodocleans 4PO/7EO, 4PO/9EO, 4PO/11EO, 5PO/11EO and 5PO/13EO exhibited significantly lower inversion times than for emulsions having EM-51 and Cationic 200.

It should be understood that the foregoing description is only illustrative of the present invention. Various alternatives and modifications can be devised by those skilled in the art without departing from the invention. Accordingly, the present invention is intended to embrace all such alternatives, modifications and variances which fall within the scope of the appended claims.

What is claimed is:

1. An inversion process comprising:

a) providing a water-in-oil emulsion having a water-soluble polymer in the aqueous phase and an activating agent of the following formula:

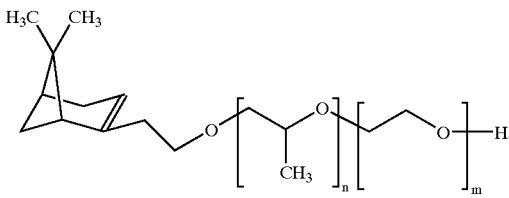

wherein n=0 to 10 and m=2 to 25; the propylene and ethylene moieties being of block distribution or intermixed in random or tapered distribution, b) introducing the emulsion into an aqueous medium; and c) allowing sufficient time for the emulsion to invert.

2. The process of claim 1, wherein n=0 to 5 and m=4 to 15.

3. The process of claim 1, wherein n=2 to 4 and m=4 to 13.

4. The process of claim 1, wherein the water soluble polymer is selected from polymers formed from the following monomers: acrylamide, methacrylamide, acrylic acid and the salts hereof, methacrylic acid and the salts thereof, crylamidomethylpropane sulfonic acid and the salts thereof, and ther vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

5. The process of claim 1, wherein the activating agent is present from about 0.5 wt % to about 7 wt % based upon the total weight of the emulsion.

6. The process of claim 1, wherein the emulsion further comprises a co-activating agent selected from the group consisting of anionic, cationic and nonionic surfactants.

7. The process of claim 1, wherein the emulsion inverts in about 30 seconds or less.

8. The process of claim 1, wherein the emulsion inverts in about 20 seconds or less.

9. The process of claim 1, wherein the emulsion inverts in about 10 seconds or less.

10. An inversion process comprising:

a) providing a water-in-oil emulsion having a water-soluble polymer in the aqueous phase;

b) introducing the emulsion into an aqueous medium having an activating agent of the following formula:

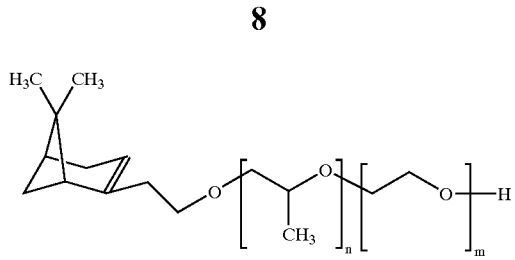

wherein n=0 to 10 and m=2 to 25; the propylene and ethylene moieties being of block distribution or intermixed in random or tapered distribution; and c) allowing sufficient time for the emulsion to invert.

11. The process of claim 10, wherein n=0 to 5 and m=4 to 15.

12. The process of claim 10, wherein n=2 to 4 and m=4 to 13.

13. The process of claim 10, wherein the water soluble polymer is selected from polymers formed from the following monomers: acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

14. The process of claim 10, wherein the activating agent is present at from about 0.5 wt % to about 7 wt % based upon the total weight of the emulsion.

15. The process of claim 10, wherein the emulsion further comprises a co-activating agent selected from the group consisting of anionic, cationic and nonionic surfactants.

16. The process of claim 10, wherein the emulsion inverts in about 30 seconds or less.

17. The process of claim 10, wherein the emulsion inverts in about 20 seconds or less.

18. The process of claim 10, wherein the emulsion inverts in about 10 seconds or less.

19. An emulsion in water-in-oil form comprising:

a) an aqueous phase having a water-soluble polymer;

b) an oil phase; and c) an activating agent of the following formula:

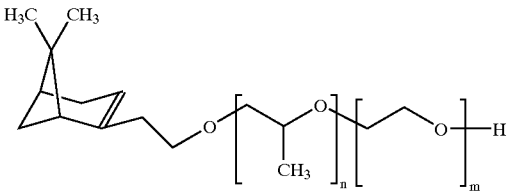

wherein n=0 to 10 and m=2 to 25, the propylene and ethylene moieties being of block distribution or intermixed in random or tapered distribution.

20. The emulsion of claim 19, wherein n=0 to 5 and m=4 to 15.

21. The emulsion of claim 19, wherein n=2 to 4 and m=4 to 13.

22. The emulsion of claim 19, wherein the water soluble polymer is selected from polymers formed from the following monomers: acrylamide, methacrylamide, acrylic acid and the salts thereof, methacrylic acid and the salts thereof, acrylamidomethylpropane sulfonic acid and the salts thereof, and other vinyl carboxylic or sulfonic acids and their salts, and amine monomers selected from the group consisting of methacrylamidopropyltrimethylamine, acrylamidopropyltrimethylamine, acryloyloxyhydroxypropyltrimethylamine, methacryloyloxyhydroxypropyltrimethylamine, acryloyloxyethyltrimethylamine, methacryloyloxyethyltrimethylamine and their salts, diallyldimethylammonium chloride or sulfate, methylenebisacrylamide, diacetone acrylamide, N-alkyl substituted acrylamides, ethylene glycol dimethacrylate, and alkoxylated (meth)acrylates.

23. The emulsion of claim 19, wherein the activating agent is present from about 0.5 wt % to about 7 wt % based upon the total weight of the emulsion.

24. The emulsion of claim 19, wherein the emulsion further comprises a co-activating agent selected from the group consisting of anionic, cationic and nonionic surfactants.

25. The emulsion of claim 19, wherein the emulsion has an inversion time of about 30 seconds or less in an aqueous medium.

26. The emulsion of claim 19, wherein the emulsion has an inversion time of about 20 seconds or less in an aqueous medium.

27. The emulsion of claim 19, wherein the emulsion has an inversion time of about 10 seconds or less in an aqueous medium.

* * * * *